United States Patent
Timson et al.

(10) Patent No.: US 11,665,621 B2
(45) Date of Patent: May 30, 2023

(54) RESTRICTING ACCESS TO A MOBILE COMMUNICATIONS NETWORK

(71) Applicant: CellXion Ltd, London (GB)

(72) Inventors: Anthony Timson, London (GB); Michael Mcternan, London (GB)

(73) Assignee: CellXion Ltd, London (GB)

( * ) Notice: Subject to any disclaimer, the term of this patent is extended or adjusted under 35 U.S.C. 154(b) by 59 days.

(21) Appl. No.: 17/368,657

(22) Filed: Jul. 6, 2021

(65) Prior Publication Data

US 2022/0015013 A1 Jan. 13, 2022

(30) Foreign Application Priority Data

Jul. 7, 2020 (GB) ..................... 2010435

(51) Int. Cl.
*H04W 48/04* (2009.01)
*H04B 17/318* (2015.01)
(Continued)

(52) U.S. Cl.
CPC .......... *H04W 48/04* (2013.01); *H04B 17/318* (2015.01); *H04W 8/04* (2013.01);
(Continued)

(58) Field of Classification Search
CPC ......... H04W 48/04; H04W 8/04; H04W 8/18; H04W 24/08; H04W 24/10; H04B 17/318
(Continued)

(56) References Cited

U.S. PATENT DOCUMENTS 8,102,314 B2 * 1/2012 Bamberger .......... H04B 17/318
342/451
9,217,788 B2 * 12/2015 Klepal ................ G01S 5/02528
(Continued)

FOREIGN PATENT DOCUMENTS

EP           0998159 A1    5/2000
WO    WO-2011132174 A1 * 10/2011 ............ H04W 36/36
WO       2018046958 A1    3/2018

OTHER PUBLICATIONS

United Kingdom Combined Search and Examination report dated Nov. 24, 2020 for United Kingdom Application No. GB2010435.2.

*Primary Examiner* — Mong-Thuy T Tran
(74) *Attorney, Agent, or Firm* — EIP US LLP (57) ABSTRACT

A system for restricting access to a mobile communications network by mobile communications devices within a restricted area includes one or more transmitters, one or more designated test mobile communications devices, and an access control entity. The access control entity is arranged to determine, using first measurement data received from one of the designated test mobile communications devices, whether one of the one or more transmitters is positioned correctly and functioning correctly for restricting the access to the mobile communications network by the mobile communications devices in the restricted area. The access control entity is further arranged to decide, based on second measurement data received from a second mobile communications device which is not a designated test mobile communications device, whether or not to provide the second mobile communication device with access to a service of the mobile communications network.

20 Claims, 4 Drawing Sheets

(51) Int. Cl.
    *H04W 8/04*     (2009.01)
    *H04W 8/18*     (2009.01)
    *H04W 24/08*    (2009.01)
    *H04W 24/10*    (2009.01)

(52) U.S. Cl.
    CPC ............ *H04W 8/18* (2013.01); *H04W 24/08* (2013.01); *H04W 24/10* (2013.01)

(58) Field of Classification Search
    USPC ..................................................... 455/422.1
    See application file for complete search history.

(56) References Cited

U.S. PATENT DOCUMENTS

| | | | |
|---|---|---|---|
| 10,111,159 B2* | 10/2018 | Scahill | H04W 48/00 |
| 2013/0162481 A1* | 6/2013 | Parvizi | G01S 5/02524 |
| | | | 342/452 |
| 2014/0213236 A1 | 7/2014 | Jimbo et al. | |
| 2017/0069149 A1* | 3/2017 | Scheja | G07C 9/27 |
| 2019/0208460 A1* | 7/2019 | Timson | H04W 40/244 |
| 2019/0244448 A1* | 8/2019 | Alamin | G07C 9/20 |

* cited by examiner

RESTRICTING ACCESS TO A MOBILE COMMUNICATIONS NETWORK

CROSS-REFERENCE TO RELATED APPLICATIONS

This application claims the benefit under 35 U.S.C. § 119(a) and 37 CFR § 1.55 to United Kingdom patent application no. GB 2010435.2 filed on Jul. 7, 2020, the entire content of which is incorporated herein by reference.

BACKGROUND

Technical Field

The present invention relates to restricting access to a mobile communications network, and has particular relevance to a method of monitoring transmitters for use in restricting access to the mobile communications network for mobile communication devices within a particular location.

Description of Related Technology

Mobile communications networks are becoming more and more ubiquitous. There are, however, some locations in which it is desired that access to a mobile communications network be restricted. One example of such a location is the immigration area in an airport. Another example of such a location is a courthouse or an embassy. Further examples of such areas are lecture halls, schools, cinemas and correctional institutions.

Various systems are already known for restricting access to a mobile communications network within a particular location. Such systems are typically referred to as Managed Access Systems (MAS's). In some of these systems, access to the mobile communications network can be permitted for certain mobile communication devices (such as cellular phones, also known as mobile phones and handy phones), identified for example by the IMSI associated with the mobile communications device appearing on an "allowed" list, but restricted for mobile phones whose IMSI does not appear on the "allowed" list. In this way, for example, passport officers within an immigration area of an airport may be able to use their mobile communications devices while arriving passengers passing through immigration are not able to do so.

A problem with such a system is that the restricted location is not well-defined, and can extend to areas in which there is no reason why the use of mobile communication devices need be restricted.

International patent publication WO2018/046958 discusses a system for restricting access to a mobile communications network for mobile communication devices within a restricted area. The system includes at least one transmitter operable to transmit a beacon signal for reception by mobile communication devices within the restricted area and an access control entity, communicable with the mobile communication device via a base station. The access control entity instructs a mobile communication device to perform at least one measurement in regard of the beacon signal from each transmitter and then to provide measurement data corresponding to said performed measurement to the access control entity. The access control entity then analyses the measurement data provided by the mobile communication device and based on that analysis decides whether or not to provide the mobile communication device with access to a service of the mobile communications network.

The system of WO 2018/046958 is reliant on the correct functioning and positioning of the at least one transmitter. Accordingly, if a transmitter malfunctions or is repositioned, erroneous decisions may be made by the access control entity. This could result in either access to a service being incorrectly withheld or incorrectly allowed.

SUMMARY

According to a first aspect of the invention, there is provided a system for restricting access to a mobile communications network by mobile communications devices within a restricted area. The system includes one or more transmitters arranged to transmit respective beacon signals for reception by mobile communications devices within the restricted area, and one or more mobile communications devices designated as test mobile communications devices and arranged to receive the beacon signals transmitted by the one or more transmitters. The system further includes an access control entity, communicable with the mobile communications devices in the restricted area via a base station. The access control entity is arranged to: determine, using first identification data received from a first mobile communications device, that the first mobile communications device is one of the designated test mobile communications devices; and determine, using first measurement data received from the first mobile communications device indicative of reception by the first mobile communications device of a beacon signal transmitted by one of the one or more transmitters, whether said one of the one or more transmitters is positioned correctly and functioning correctly for restricting the access to the mobile communications network by the mobile communications devices within the restricted area. The access control entity is further arranged to: determine, using second identification data received from a second mobile communications device, that the second mobile communications device is not one of the designated test mobile communications devices; and decide, based on second measurement data received from the second mobile communications device indicative of reception of a beacon signal by the second mobile communications device, whether or not to provide the second mobile communication device with access to a service of the mobile communications network.

The access control system described above is self-monitoring in that the access control entity automatically monitors the functioning of the one or more transmitters via the one or more test mobile communications devices. If one of the transmitters malfunctions or is tampered with, the system is made aware of the malfunction or tampering via the one or more test mobile communications devices, and can perform an appropriate action, for example generating an alert for a human user or another automated system, and/or initiating a backup configuration for the access control entity on the assumption that only a subset of the transmitters is now working. The test mobile communications devices are only required to provide measurement data, which is a standard function of mobile stations according to various standards. Therefore, the test mobile communications devices can be implemented as standard mobile station with no dedicated software or modifications, allowing the self-monitoring aspect of the system to be implemented conveniently by a network provider by incorporating additional code into a radio access network and/or core network, for example within a base station controller of the base station, or a mobile switching centre connected to the base station.

In examples, the first measurement data includes a measured signal strength of the beacon signal received by the first mobile communications device, and determining whether said one of the one or more transmitters is positioned correctly and functioning correctly comprises determining that the measured signal strength is within a respective range. In this way, if the transmitter is physically moved or disabled, for example as part of an attempt to circumvent the access restriction system, the measurement criteria will no longer be satisfied.

In examples, determining whether said one of the one or more transmitters is positioned correctly and functioning correctly comprises determining whether a set of measurement criteria associated with the first mobile communications device is satisfied, the set of measurement criteria being configurable based upon third measurement data indicative of reception by the first mobile communications device of the beacon signal transmitted by the first transmitter during a configuration process. This allows the one or more transmitters to be repositioned, for example if the restricted area needs modifying or if an initial arrangement of transmitters becomes compromised.

The designated test mobile communications devices can be arranged to transmit measurement data in accordance with a predetermined schedule, for example at regular intervals. The predetermined schedule may be configured to ensure that measurement data is sent frequently enough to ensure security of the access control system, but not so frequently that the test mobile communications devices use power wastefully, or generate unnecessary messaging traffic. If a test mobile communications device fails to send measurement data in accordance with the predetermined schedule, an alert may be generated to make a human user or further software component aware that the test device has malfunctioned or has been tampered with.

According to a second aspect of the invention, there is provided a method of restricting access to a mobile communications network by mobile communications devices within a restricted area. The method includes arranging one or more transmitters to transmit respective beacon signals for reception by mobile communications devices within the restricted area, designating one or more mobile communications devices as test mobile communications devices, and arranging the one or more designated test mobile communications devices to receive the beacon signals transmitted by the one or more transmitters. The method includes: receiving, from a first mobile communications device, first identification data and first measurement data indicative of reception by the first mobile communications device of a beacon signal transmitted by one of the one or more transmitters; determining, using the first identification data, that the first mobile communications device is one of the designated test mobile communications devices; and determining, using the first measurement data, whether said one of the one or more transmitters is positioned correctly and functioning correctly for restricting the access to the mobile communications network by the mobile communications devices within the restricted area. The method further includes: receiving, from a second mobile communications device, second identification data and second measurement data indicative of reception of a beacon signal by the second mobile communications device; determining, using the second identification data, that the second mobile communications device is not one of the one or more designated test mobile communications devices; and deciding, based on the second measurement data, whether or not to provide the second mobile communication device with access to a service of the mobile communications network.

According to a third aspect of the invention, there is provided a non-transient storage medium comprising machine readable instructions which, when executed by a computing system communicable with mobile communications devices within a restricted area via a base station, cause the computing system to: determine, using first identification data received from a first mobile communications device, that the first mobile communications device is a designated test mobile communications device; determine, using first measurement data received from the first mobile communications device indicative of reception by the first mobile communications device of a beacon signal transmitted by a first transmitter, whether the first transmitter is positioned correctly and functioning correctly for restricting the access to the mobile communications network by the mobile communications devices within the restricted area; determine, using second identification data received from a second mobile communications device, that the second mobile communications device is not a designated test mobile communications device; and decide, based on second measurement data received from the second mobile communications device indicative of reception of a beacon signal by the second mobile communications device, whether or not to provide the second mobile communication device with access to a service of the mobile communications network.

Further features and advantages of the invention will become apparent from the following description of examples of the invention, which is made with reference to the accompanying drawings.

DETAILED DESCRIPTION

Figure 1:
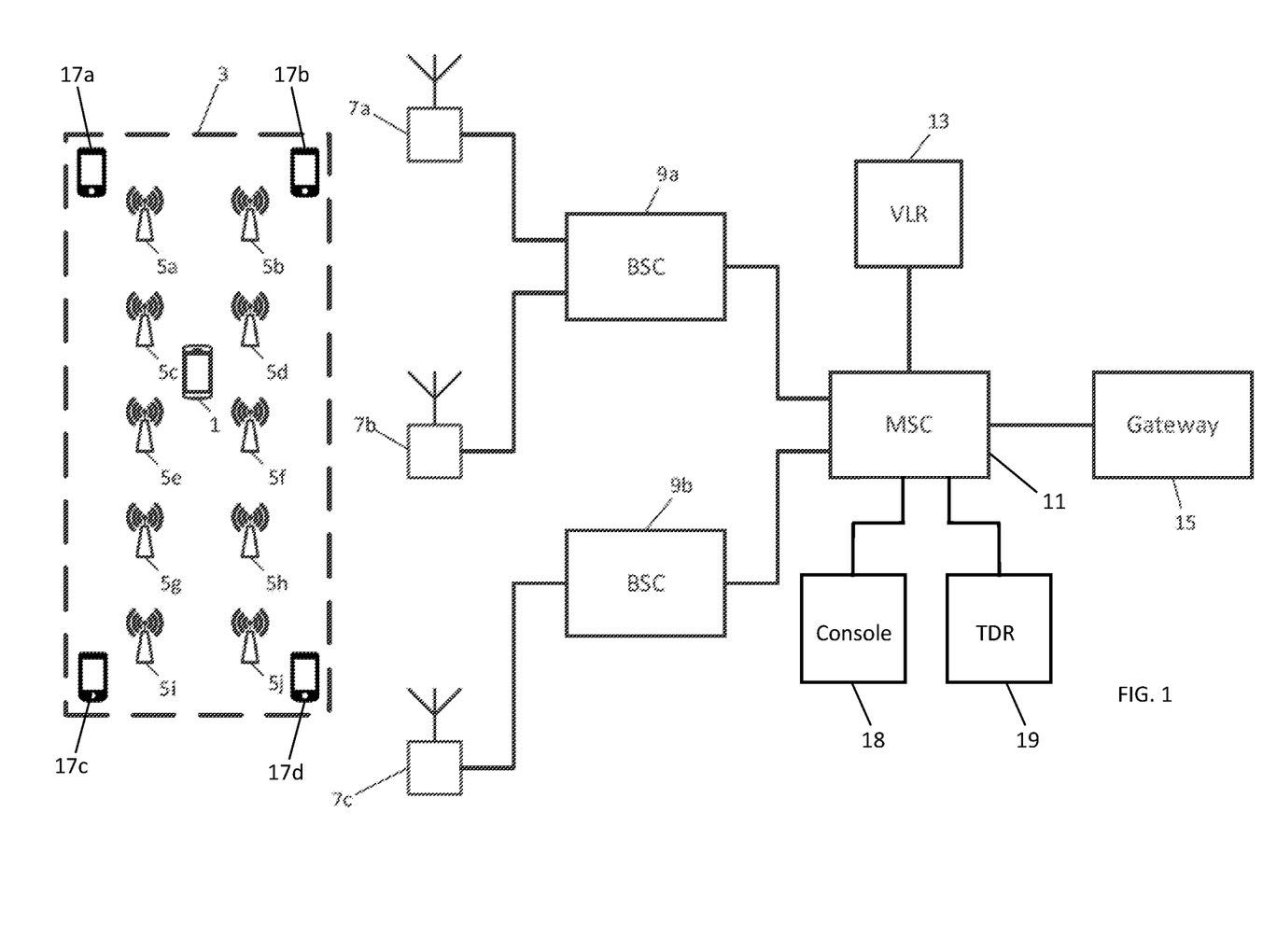
FIG. 1 schematically shows a first example of an implementation of the present invention.

FIG. 1 schematically shows a system for controlling access of a mobile communication device 1 within a restricted area 3 (represented by the dashed block) to a mobile communications network. An example of restricted area 3 may be an immigration hall at an airport. In this example, the mobile communications network conforms to the GSM standards.

As shown in FIG. 1, a plurality of measurement beacons 5a-5j are disposed within the restricted area. A measurement beacon 5 is a transmitter that transmits a beacon signal. In this example, each measurement beacon 5 is effectively a downlink only base station (BTS), which provides enough information (it is recommended a full BCCH with cell barring enabled, although a lesser subset (ie: FB/SB including BSIC) could work) for the mobile communication device 1 to measure its beacon signal and report the measurement to the mobile communications network for determination of action (ordinarily this would be a handover).

The measurement beacons 5 are programmed in a way to make them uniquely identifiable within a code set and can be of varying power depending on the desired area of coverage. Due to this ability to uniquely code each beacon it is possible to have many in a small area and identify each one from which a beacon signal is received, giving the benefit of providing coarse positional information.

The mobile communication device 1 communicates with base stations 7a-7c of a public land mobile network (PLMN). In FIG. 1, two of the base stations 7a,7b are connected to a first base station controller 9a while the other base station is connected to a second base station controller 9b. The first and second base station controllers 9a,9b are connected to a mobile switching centre (MSC) 11, which is in turn connected to a Visitor Location Register (VLR) 13 and a gateway 15.

GSM and other cellular protocols provide for a list of neighbour cells to be advertised from a serving base station. In the case of GSM, this is advertised in the System Information 5 message, carried on a dedicated channel during a communication session between a MS and a BTS. ETSI specification GSM04.08 section 9.1.3.7 clearly describes the process for encoding an SI5 message, and section 3.4.1 describes when it should be present.

When a dedicated channel is established, an MS will attempt to measure all the cells which are handover candidates from the SI5 message and return these values to the serving BTS in a Measurement Report. This process is described in GSM04.08 section 3.4.1.2, and GSM05.08, section 8. The pertinent features for this invention are the recovery of ARFCN/RXLEV/RXQUAL and BSIC.

In this example, the operator of the PLMN has allowed the airport to use a block of ten GSM channels to facilitate operation of the invention—a description of each measurement beacon's configuration is illustrated below:

| Location | BCCH | BSIC |
| --- | --- | --- |
| Beacon 5a | 870 | 1 |
| Beacon 5b | 872 | 2 |
| Beacon 5c | 874 | 3 |
| Beacon 5d | 876 | 4 |
| Beacon 5e | 878 | 5 |
| Beacon 5f | 871 | 6 |
| Beacon 5g | 873 | 7 |
| Beacon 5h | 875 | 9 |
| Beacon 5i | 877 | 10 |
| Beacon 5j | 879 | 11 |

This configuration takes into account the properties of channel separation for GSM to work effectively, and the measurement beacons 5 would be of a low power, for instance 0 dBm. Mobile network technology has been designed to allow for determination of multiple cells or at least the dominant cell in an environment where more than one cell can be received on a single ARFCN. In GSM, this is the function of the BSIC. It is required that the network operator puts the list of ARFCN's for the beacons into an SI5 list of its local BTS's that service the airport.

When the user of the mobile communication device 1 attempts to perform any type of activity, for instance making a call, sending an SMS or starting a data session, a dedicated channel is established between the mobile communication device 1 and the serving base station 7. This will trigger the sending of the Measurement Reports to the BSC 9, and these will contain measurements received from cells contained in the SI5 message. It would also be completely normal for this SI5 list to contain the adjacent cells of the network as well as the artificially introduced beacons as the network will still use the non-beacon channels for handover. The standards dictate that at least the top six strongest measured cells must be reported where they can be decoded.

Once a dedicated channel is established, it can be calculated quickly if the user of the MS is in the vicinity of the measurement beacons 5 in the restricted area 3 due to the presence or lack of ARFCN/BSIC combinations deployed at the airport in the measurement reports that the MS will be sending. The RXLEV and RXQUAL will also give a determination of how close the MS is to the beacon.

If there are no measurements received with the ARFCN/BSC combination from the airport then it can be assumed that the MS is not present in the restricted area 3 and therefore the mobile communication device 1 can be given full network access. If however any of the ARFCN/BSIC combinations from the restricted area are received in the measurement reports then it can be deduced that the mobile communications device 1 is in the vicinity of one or more of the measurement beacons 5. Additionally, it is possible to identify an approximate location of the mobile communications device 1 based on the RXLEV for the reported measurement beacons 5. For instance:

| BCCH | BSIC | RXLEV |
| --- | --- | --- |
| 874 | 3 | 38 |
| 876 | 4 | 35 |
| 878 | 5 | 54 |
| 871 | 6 | 55 |

In the example above, we could deduce that the MS is positioned between measurement beacons 5e and 5f due to the similar RXLEV's from those measurement beacons 5. Analytical software can be used to determine the position of the MS based on the RXLEV's from the MS. Such analytical software typically requires some of the following inputs to estimate a mobile's position in a MAS system:

1) Details of beacon placement, transmit power, antenna facing, channel number and BSIC.
2) RF propagation models based on the above when combined with structural models of the site or facility of interest, including such things as placement and materials for walls, ceilings and floors, ducting and any other significant metallic bodies.
3) RF survey results from walk test of the facility or sites of interest.

Given one or more measurement reports from a mobile, the analytical software can compare the top 6 reported neighbour BSIC and RXLEV values to models formed from the above data to produce estimates as to the likely location or locations of an MS. Collecting successive measurement reports can allow for further accuracy in the positioning estimate by further processing the reported RXLEV values to remove the effect of RF fading by filtering or averaging.

The base stations for the restricted area are configured such that their BA lists for dedicated mode (the SI5 set of messages) include the radio channels (ARFCNs) used by the beacons in the system. An additional modification may also be made to the BTS operation such that dedicated channels are held connected for a minimum amount of time sufficient for:

1) A MS to detect and measure a neighbour cell, or beacon in this case
2) The MS to report the top 6 cells to the BTS in a Measurement Report messages The 3GPP standards define the Measurement Reporting period as 480 ms, and also set requirements on neighbour cell detection and measurement frequency and accuracy. The maximum duration of a dedicated channel is subject to protocol stack guard timers and cannot be indefinite without signalling progress being made, but can be extended towards 10 seconds without problem. The dedicated channel can be held open for a variable duration to allow collection of more or fewer Measurement Reports as required to achieve the required confidence in the analytical result. This may also use prior decisions such that MS's which have already been found to either be within or outside the area of effect are quickly handled without holding resources at the base station for longer than necessary.

The decision making process would be coded in an ordinary network in the MSC 11 in the form of an access control entity, via extensions from the Base Station Controller to forward the measurements as ordinarily the MSC 11 is not aware of radio measurements. To a person skilled in the art, there are several ways to achieve this including proprietary or standards compliant messaging, and it would even be possible to process the measurement reports from a mobile communication device 1 to determine if it is in the restricted area 3 inside the BSC 9, and simply pass a decision message to the MSC 11.

So far as the MSC 11 is concerned, one possible method to implement the access control entity could be an additional step in the MM Location/Routing Update procedure which would follow the identity and optional authentication responses. Once the mobile communications device has been determined to be allowed onto the network through a HLR check, a further step would take place to validate the measurement reports and determine if the mobile communications device 1 is in the restricted area 3. If the mobile communications device 1 is not in the restricted area 3 then the regular process would be followed, however, if the mobile communications device is in the restricted area 3 then a suitable layer three response could be issued to the mobile communication device 1 such as "congestion". This would cause the mobile communication device 1 to frequently retry, thus allowing an immediate reversion back to regular service once out of the restricted area 3.

In another example, the access control entity could be coded into the MSC 11 to extend the process CM Service Request procedures for SMS and Calls. When the mobile communications device 1 initiates a call, a CM Service Request message is sent to the base station 7. At this time the MSC 11 could wait for a set of measurement reports and determine if the mobile communications device 1 is in the restricted area 3. If not, then the normal procedure could be followed, otherwise a suitable layer three rejection message could be passed back to the MS such as "Congestion".

In yet another example, the access control entity could be coded purely into the MSC 11 provided that the BSC 9 was configured so that the Beacon ARFCN/BSIC values were treated as an inter-MSC cell list. This would not provide the complete set of measurements to the MSC 11, however, it would be a simpler implementation as the BSC 9 if correctly configured, would tell the MSC that it needed to perform an inter-MSC handover to one of the Beacons. At this point, the MSC, knowing that the handover candidate is not an actual base station 7 would simply tear down the session with a layer three Channel Release message. This method has the advantage of being able to stop a session which was established prior to a mobile communication device 1 entering into the restricted area 3.

Ideally, all three examples above could be implemented in parallel. This way you can restrict access at authentication level, setup attempt, and cease traffic that is already established. For data sessions the same process could be applied at the SGSN, or even in the IP domain provided that you could tie the IP session to an IMSI/IMEI in the restricted area.

In order to protect the system of FIG. 1 against malfunctioning of the measurement beacons 5, for example due to accidental damage or loss of power, or tampering by a malicious party, the access control entity is further arranged to monitor the measurement beacons 5 in an automated way. For this purpose, a set of one or more mobile communications devices disposed in or around the restricted area 3 are designated as test mobile communications devices 17*a-d* (referred to hereafter as test devices 17*a-d*). The test devices 17*a-d* are arranged with respect to the measurement beacons 5*a-j* such that beacon signals transmitted by each of the measurement beacons 5*a-j* can be received by at least one respective test device 17.

In this example, each test device 17 is a standard MS installed in a fixed position for the sole purpose of monitoring the measurement beacons 5. The test devices 17 in this example are each connected to a mains power supply and are physically inaccessible to members of the public. Additionally, or alternatively, the test devices 17 may be powered by batteries, for example as a backup in case of a mains power failure. Each test device 17 has a dedicated IMSI and includes at least the necessary functionality to establish a dedicated communications channel with one of the base stations 7 as described in GSM04.08 section 3.4.1.2 and GSM05.08 section 8. When the test devices 17 interact with the network, each test device 17 is allocated a TMSI by the network in the usual manner, which is stored in the VLR 13. The TMSI may be updated using the procedure set out in GSM04.08 section 4.3.1.

In addition to the VLR 13, the MSC 11 is connected to a console 18 and a test device register 19. An operator of the access control system can enter identification information (such as an IMSI) for a new test device 17 via the console 18, for example via a user interface of the console 18. It is noted that the console 18 may be remote from the MSC 11, and may be any form of computing device able to communicate with the MSC 11 and/or the test device register 19. The test device register 19 maintains identification data that can be used by the access control entity to distinguish the test devices 17 from any other mobile communications devices in the area, such as the mobile communications device 1. In this example, the test device register 19 maintains an up-to-date list of TMSIs currently allocated to the test devices 17.

Each test device 17 is configured to periodically establish a dedicated channel with one of the base stations 7 using the periodic updating procedure described in GSM04.08 section 4.4.2 in conjunction with the immediate assignment procedure described in GSM04.08 section 3.3.1. The periodic updating procedure is identical to the location updating procedure which is performed when an MS enters a new location area, except that the periodic updating procedure is initiated on a periodic basis using an onboard timer T3212 of the MS. The duration of the timer T3212 is configurable and can be updated by the network at any time, to any multiple of 6 minutes from 0 to 255. An appropriate choice of T3212 duration for the present invention will depend on the specific application. A shorter T3212 duration will result on average in faster identification of failures of the measurement beacons 5 and thus provides better security. However, a shorter T3212 duration will result in a greater signalling load between the test devices 17 and the network, and more energy use by the test devices 17.

The periodic updating procedure performed for a given test device 17 includes an authentication procedure and, if necessary, an identification procedure being performed, resulting in the MSC 11 receiving identification data for uniquely identifying the test device 17, namely the TMSI of the test device 17.

Upon receiving the identification data, the access control entity checks whether the TMSI received from the test device 17 matches any of the TMSIs stored in the test device register 19. When a match is found, the access control entity knows that it is communicating with one of the test devices 17, as opposed to another mobile communications device, and initiates a monitoring routine. The monitoring routine is different to the access control routine performed for mobile communications devices which are not identified as test devices, such as mobile communications device 1.

The establishing of the dedicated channel using the periodic updating procedure triggers the sending of a Measurement Report from the test device 17 to the base station 7. The Measurement Report includes measurement data indicative of reception by the test device 17 of beacon signals for cells advertised within an SI5 message transmitted by the base station 7. The cells advertised by each of the base stations 7a-c include at least a respective subset of the measurement beacons 5.

As explained above, the BSC 9 of each of the base stations 7a-c is adapted to pass the measurement data conveyed in Measurement Reports to the MSC 11 in which the access control entity resides. Upon determining that the base station 7 is communicating with one of the test devices 17, the access control entity analyses the measurement data contained within the Measurement Report and determines whether a respective set of measurement criteria are satisfied. In the present example, the measurement criteria for a given test device 17 include each of one or more beacon signals received by that test device 17 having a reported RXLEV within a given range, corresponding to a specified range of signal strengths (in accordance with the definition given in GSM05.08 section 8.1.4). The acceptable range for a given beacon signal received by a given test device 17 may be a closed range bounded by a threshold minimum value and a threshold maximum value, or may be an open range bounded only by a threshold minimum value. The acceptable range may include only a single acceptable RXLEV value or may include multiple acceptable RXLEV values. In the present example, each measurement beacon 5 is monitored by at least two of the test devices 17, making it impossible to move one of the measurement beacons 5 without causing the RXLEV to move out of the acceptable range for at least one of the test devices 17.

In further examples, measurement criteria specify that an average RXLEV value reported over multiple Measurement Reports within a given reporting period is within a given range. Using average values reduces erroneous results being caused by fluctuations in signal strength. In still further examples, the measurement criteria specify only that a beacon signal is received from each measurement beacon 5 within a given reporting period, and do not further specify ranges of signal strengths for the received signals. Such criteria may be suitable in environments where large fluctuations in signal strength are expected, or where a mobile communications standard does not require the sending of signal strength data. In some examples, measurement criteria corresponding to different measurement beacons 5 and/or different test devices 7 can be interdependent. For example, the measurement criteria may specify that the RXLEV reported by a given test device 17 for a given measurement beacon 5 does not fall in relation to other RXLEVs reported by that test device 17.

If the access control entity determines that the measurement data provided by all of the test devices 17 satisfies the specified measurement criteria, it is determined that the measurement beacons 5 are functioning correctly and have not been repositioned from their initial configuration. In this case, no further action is taken until the next scheduled reporting of measurement data.

If the access control entity determines that the respective measurement data provided by any of the test devices 17 does not satisfy the respective measurement criteria, the access control entity determines from the measurement data which of the one or more of the measurement beacons 5 is not functioning as expected. In this case, the access control entity generates an alert, which may be provided to an operator of the system, for example via a user interface of the console 18 or in a message transmitted via the base station 7. The message may include information as to which of the measurement beacons 5 is not functioning as expected, enabling the operator to know immediately which measurement beacon or beacons 5 need to be checked.

In addition to generating an alert upon determining that one of the measurement beacons 5 is not functioning as expected, the access control entity may be configured to initiate a backup configuration for the access control entity. The backup configuration specifies backup criteria for deciding whether to restrict access by mobile communications devices to the mobile communications network, on the assumption that only a subset of the measurement beacons 5 is now functioning. In order to define a suitable backup configuration to cover a malfunction of any one of the measurement beacons 5, a level of redundancy is required such that every part of the restricted area is covered by at least two of the measurement beacons 5. As explained above, such redundancy is advantageous in any case, as it removes the possibility of fooling the access control system by carefully moving one of the measurement beacons 5 in such a way that the signal strength received by a given test device 17 does not change (for example by moving a measurement beacon 5 at a constant distance from the test device).

The monitoring system described above reduces the vulnerability of the access control system to malfunctions of the measurement beacons 5, for example caused by accidental failure or tampering. Although it is feasible that one or more of the test devices 17 could malfunction at the same time as one or more of the measurement beacons 5 (for example if a malicious party were to tamper with both), this would not cause the monitoring system to fail, because the system requires the test devices 17 to periodically report measurement data to the network. If one of the test device 17 fails to report to the network at the expected time, an alert is generated, which may be provided to an operator of the system, for example via a user interface of the console 18 or in a message transmitted via the base station 7. The message may specify which of the test devices 17 failed to report to the network. Alternatively, an alert may be generated only if the test device 17 fails to report measurement data over multiple reporting periods.

The measurement criteria applied for a given test device 17 are set during an initial configuration process, and may be modified during subsequent configuration processes, for example if the definition of the restricted area 3 changes or if the arrangement of measurement beacons 5 or the test devices 17 changes. Prior to the configuration process, the measurement beacons 5 are deployed and tested by an independent means to ensure the measurement beacons 5 are operating correctly. The access control entity then collects measurement data from each of the test devices 17 during a configuration period. During the configuration period, the test devices 17 behave in exactly the same way as during the usual operation of the system. The measurement criteria are then configured in dependence on the measurement data collected during the configuration period. For example, the measurement criteria may be configured to specify that the RXLEV of a beacon signal received by a given test device 17 from a given measurement beacon 5 must be within a range based upon one or more corresponding RXLEV values received during the configuration period.

The monitoring system described above has the advantage that each of the test devices 7 can be implemented as a standard MS without needing any dedicated software or modifications (except, possible, changing the duration of the timer T3212). Given the basic functionality required for the test devices 7, each test device 7 can be a simple, robust and cheap MS. Furthermore, every aspect of the monitoring system is controllable from the network side. In order to implement the system of FIG. 1, including the self-monitoring functionality, only the MSC 11 needs to be modified. In an alternative implementation, the self-monitoring functionality is implemented within one or more of the BSCs 9 instead of the MSC 11. In this case, the measurement data provided by each test device 17 is analysed at the BSC 9 of the base station 7 via which the test device 17 communicates with the network.

In the example described above, the sending of measurement data is initiated by the test devices 17 using the periodic update procedure. In an alternative implementation, the sending of measurement data is initiated from the network side. In order to initiate the sending of measurement data, a paging request can be transmitted from a base station 7 to a test device 17 as described in GSM04.08 section 3.3.2, resulting in a dedicated channel being established between base station 7 and the test device 17, and the sending of a Measurement Report. This alternative implementation similarly does not require modification of the test devices 7, and allows for measurement data to be requested in accordance with any given schedule, not necessarily just a periodic schedule. This may be of interest, for example, if an area is only restricted at certain times, in which case the measurement beacons 5 would not need to be continually monitored whilst the area is not restricted. In some examples, a combination of both methods for initiating the sending of measurement data can be used.

Although in the example described above, the test devices 17 have fixed positions to allow ongoing monitoring of the measurement beacons 5, in other examples it may only be deemed necessary to check the statuses of the measurement beacons 5 at certain times. In this case, a test device 17 can be implemented as a handheld MS such as a smartphone, which a human user takes to one or more predetermined monitoring positions in order for signal measurements to be taken. In this case, the providing of measurement data may be in response to human input at the handheld MS, rather than being in accordance with a predetermined schedule.

Figure 2:
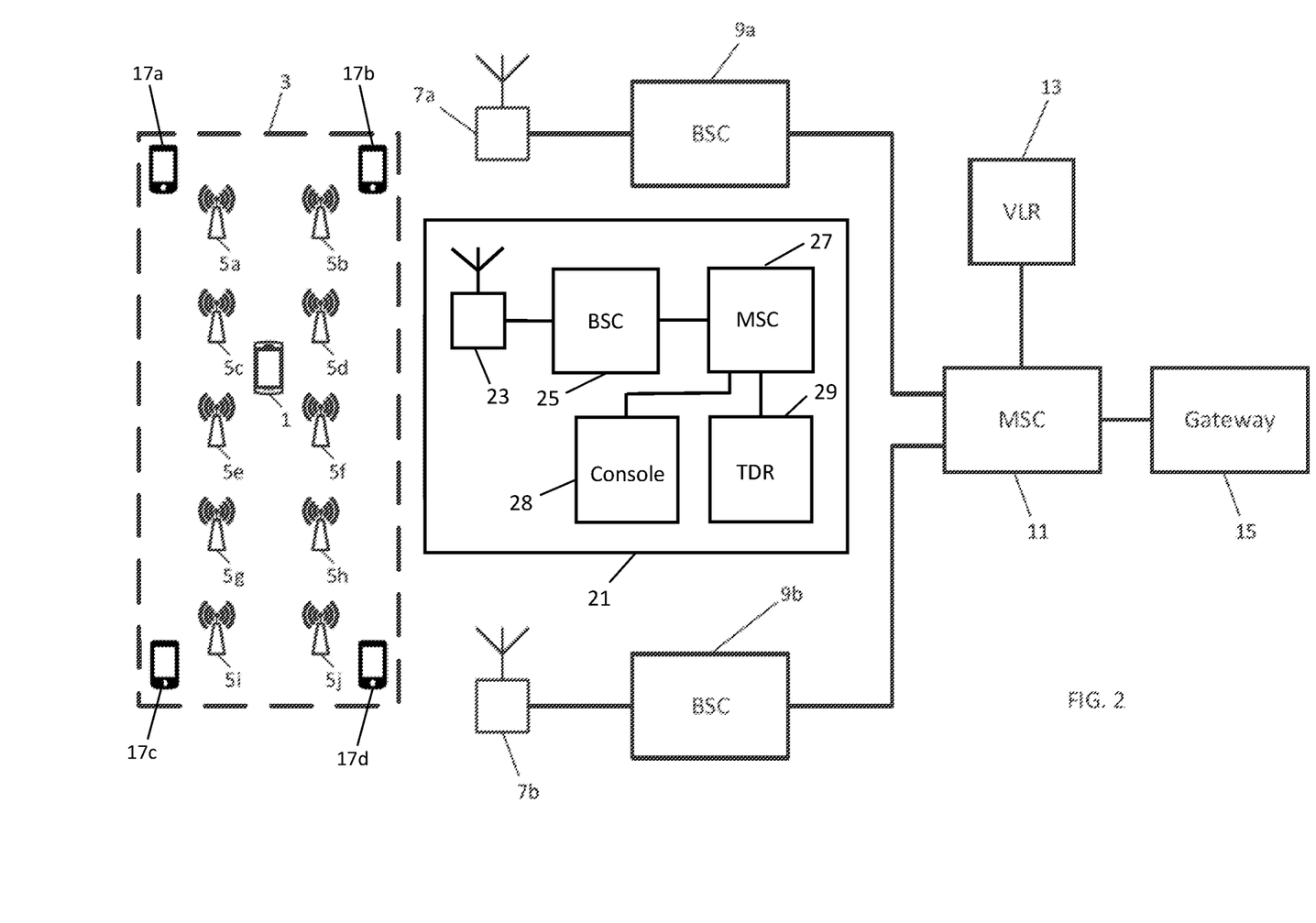
FIG. 2 schematically shows a second example of an implementation of the present invention.

In the above examples, the access control entity is implemented by a network operator after integrating associated code into their core network or radio access network or distributed between the core network and the radio access network. Each of the test devices 17 is therefore registered with an HLR of a PLMN operated by the network operator. In order to prevent the test devices 17 from being used to make or receive calls, subscription information stored at the HLR for each of the test device 17 may specify that call barring is applied. In alternative examples, an independent base station (that is one not forming part of the main Public Land Mobile Networks) is introduced into the network. As shown in FIG. 2, the independent base station 23 may be connected to an independent BSC 25 and an independent MSC 27 forming part of an independent managed network 21. The MSC 27 is connected to a console 28 and a test device register 29, and may further be connected to a gateway device (not shown) allowing communication with PLMNs.

In the example of FIG. 2, the test device register 29 is implemented as an independent home location register (HLR) of the independent managed network 21. The independent HLR functions analogously to a regular HLR of a PLMN, but only the test devices 17 are registered with the independent HLR. The independent HLR stores subscription information including an IMSI and Mobile Station International Subscriber Directory Number (MSISDN) for each of the test devices 17, and further specifying that public roaming is not permitted for any of the test devices 17. By preventing roaming, the test devices 17 are unable to connect to PLMNs other than the independent managed network 21, for example in the case that one of the test devices 17 is physically moved to a location not covered by the independent base station 23. The test devices 17 are thereby prevented from making or receive calls via any PLMN. The access control entity is able to determine whether a given mobile communications device is one of the test devices 17 based on whether the mobile communications device is registered with the independent HLR. It will be appreciated that, in other examples, a test device register could be implemented as an additional component to an HLR of an independent managed network.

The independent base station 23 has a coverage area extending over, but not necessarily limited to, the restricted area. The independent base station 23 has a different Location Area Code to the surrounding network and therefore triggers a Location Update procedure to any mobile communication device which comes into range of it. At this point, the measurement of the beacon signals from the measurement beacons 5 can be triggered, the resultant measurement data analysed and the appropriate layer three response issued to the MS. The benefit of the forced Location Update procedure is the ability to control the MS at authentication point and make it indicate "NO SERVICE" if necessary. A benefit of this approach is that it does not require any changes to the network operator's infrastructure outside the building, although it may be advantageous for neighbouring base stations preferentially to handover mobile communication devices to the independent base station.

Figure 3:
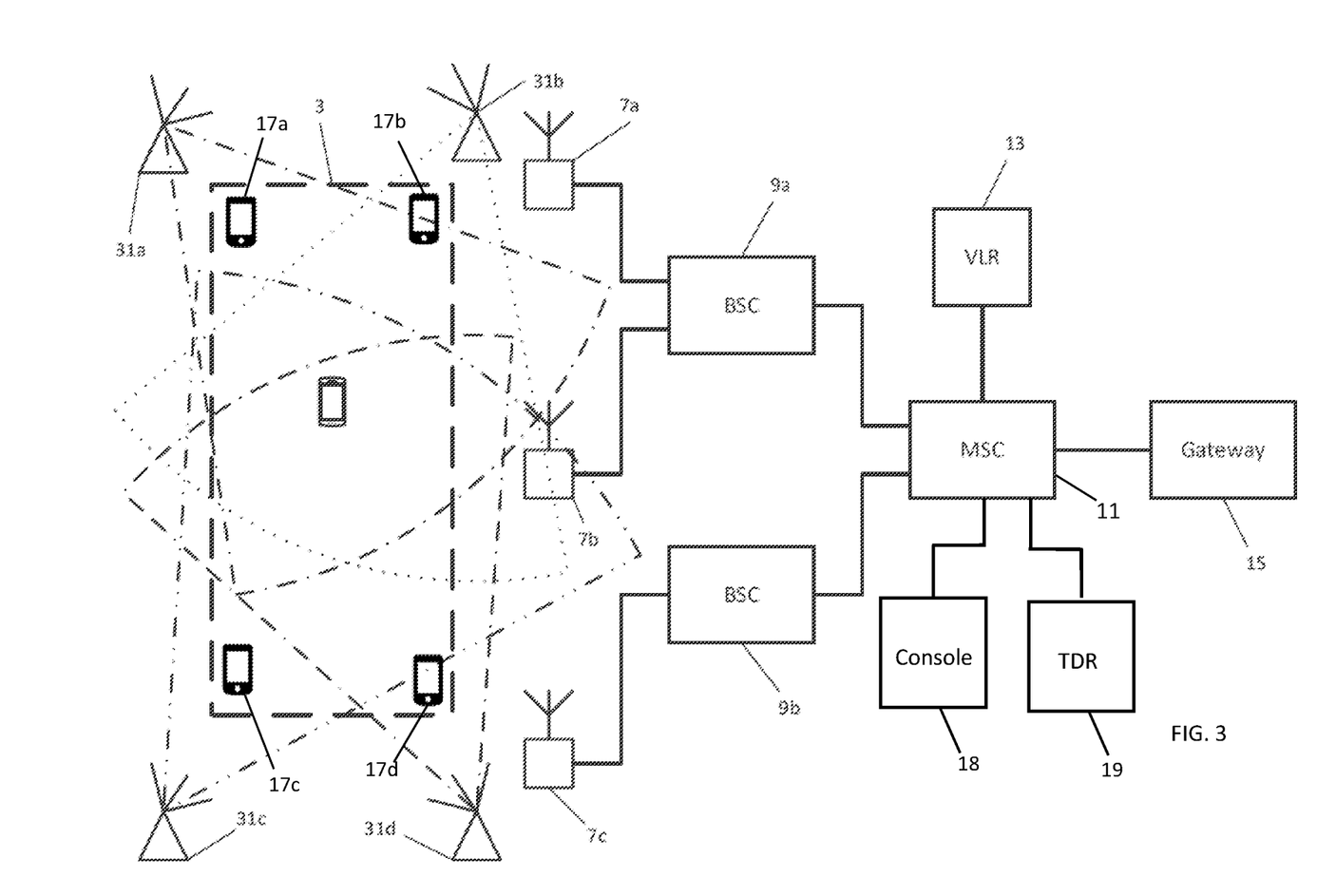
FIG. 3 schematically shows a third example of an implementation of the present invention.

As shown in FIG. 3, in another example instead of positioning measurement beacons within the restricted area 5, measurement beacons 31 with directional antennae can be provided around the periphery of the restricted area 5. The directional antenna for each measurement beacon 31 directs the associated beacon signal to the restricted area 5, and the measurement beacons 31 are arranged so that whether or not the mobile communication device 1 is within the restricted area 3 can be determined from measurements of the beacon signals.

Figure 4:
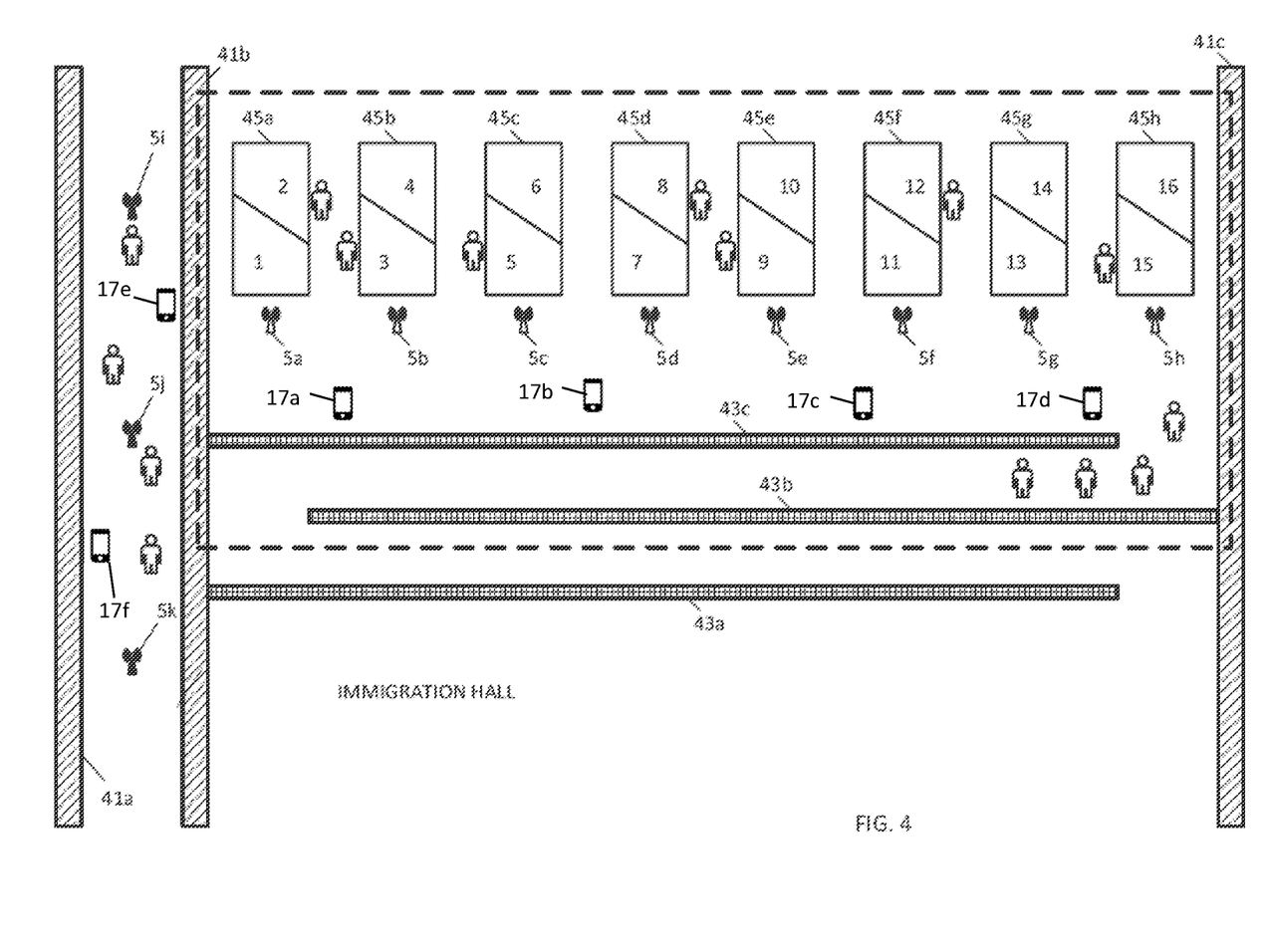
FIG. 4 shows a schematic plan view of an implementation of the present invention in the immigration hall of an airport.

One of the key advantages of the systems described above is the ability to tightly control a perimeter. For instance, FIG. 4 schematically shows for the immigration are example previously mentioned, an immigration hall bounded by walls 41*b* and 41*c*, with a departures lane passing nearby between walls 41*a* and 41*b*. The immigration line, guided by barriers 43*a*-43*c*, directs people to passport check booths 45*a*-45*h*, each passport check booth 45 holding two passport check positions. In this example, measurement beacons 5*a*-5*h* (hereafter referred to as deny measurement beacons) are provided adjacent the passport check booths 45 and measurement beacons 5*i*-5*k* (hereafter called override measurement beacons) are provided in the departure lane. The deny measurement beacons and the override measurement beacons are functionally identical, but the access control entity treats them differently. For example, the access control entity could apply an algorithm such as: Deny Access if any three ARFCN/BSIC combinations for deny measurement beacons have RXLEV>30, unless an ARFCN/BSIC for an override measurement beacon has an RXLEV>30, in which case allow access—this is of course possible due to the ability to uniquely identify each Beacon. Once the Beacons are installed, it would be relatively straightforward to analyse the measurements and in fact, using measurement tools at installation the radio environment could be modelled to provide detailed positioning data.

In an alternative example, no deny measurement beacons are needed but only override measurement beacons are provided, detection of one or more override measurement beacons overriding a default decision to deny access.

In an example, successive measurement reports may give different sets of BSICs and RXLEV values, indicating that the MS is in motion. Using prior knowledge of beacon placement, the speed of the MS can be estimated. In itself for some sites this may provide evidence that an MS is for example, moving by car down a road adjacent to the desired restricted area, as opposed to being within the restricted area presuming that there are no parallel roads on site.

The description herein describes this technology being used in a GSM network, however, the person skilled in the art will know that it can be applied to other Radio Access Technologies (RATs). For instance to use this method in UMTS, the Beacon would have a distinct UARFCN/PSC combination, and in LTE it would have a distinct EARFCN/PCI combination. Additionally it is possible in more modern RATs to prioritise certain cells using hierarchy such as HCS. This allows the Beacons to be measured first if necessary. It is also possible in higher technology RATs to force an MS to measure a lower technology RAT cell, thus it would be possible to use GSM beacons in an LTE or UMTS network under most circumstances.

Although in the embodiments described above, measurement data is forwarded by the BSC to the access control entity for analysis, in other examples measurement data may be retrieved or derived, using suitable software and hardware, from any practical interface within the network that has access to the measurement data, for example the Abis interface in GSM or the radio resource control (RRC) sublayer of the UMTS radio interface.

What is claimed is:

1. A system for restricting access to a mobile communications network by mobile communications devices within a restricted area, the system comprising:
one or more transmitters arranged to transmit respective beacon signals for reception by mobile communications devices within the restricted area;
one or more mobile communications devices designated as test mobile communications devices and installed in respective fixed positions to receive the beacon signals transmitted by the one or more transmitters; and
an access control entity, communicable with the mobile communications devices in the restricted area via a base station,
wherein the access control entity is arranged to:
determine, using first identification data received from a first mobile communications device, that the first mobile communications device is one of the designated test mobile communications devices;
determine, using first measurement data received from the first mobile communications device indicative of reception by the first mobile communications device of a first beacon signal transmitted by one of the one or more transmitters, whether said one of the one or more transmitters is functioning correctly and positioned correctly relative to the fixed position of the first mobile communications device for restricting the access to the mobile communications network by the mobile communications devices within the restricted area;
receiving, from a second mobile communications device, second identification data and second measurement data indicative of reception of the first beacon signal by the second mobile communications device;
determine, using the second identification data, that the second mobile communications device is not one of the designated test mobile communications devices; and
decide, based on the second measurement data, whether or not to provide the second mobile communication device with access to a service of the mobile communications network.

2. The system of claim 1, wherein:
the first measurement data comprises a measured signal strength of the beacon signal received by the first mobile communications device; and
determining whether said one of the one or more transmitters is positioned correctly and functioning correctly comprises determining that the measured signal strength is within a respective range.

3. The system of claim 1, wherein:
the first measurement data comprises an average measured signal strength of the beacon signal received by the first mobile communications device over a plurality of measurements; and
determining whether said one of the one or more transmitters is positioned correctly and functioning correctly comprises determining that the average measured signal strength is within a respective range.

4. The system of claim 1, wherein determining whether said one of the one or more transmitters is positioned correctly and functioning correctly comprises determining whether a set of measurement criteria associated with the first mobile communications device is satisfied, the set of measurement criteria being configurable based upon third measurement data indicative of reception by the first mobile communications device of the beacon signal transmitted by the first transmitter during a configuration process.

5. The system of claim 1, wherein the designated test mobile communications devices are arranged to transmit measurement data within respective measurement reports.

6. The system of claim 1, wherein the designated test communications devices are arranged to provide measurement data to the access control entity in accordance with a predetermined schedule.

7. The system of claim 6, arranged to generate an alert when one of the designated test communications devices fails to provide measurement data to the access control entity in accordance with the predetermined schedule.

8. The system of claim 1, arranged to generate an alert upon determining that said one of the one or more transmitters is not positioned correctly and functioning correctly for restricting the access to the mobile communications network by the mobile communications devices within the restricted area.

9. The system of claim 1, arranged to initiate a backup configuration for the access control entity upon determining that said one of the one or more transmitters is not positioned correctly and functioning correctly for restricting the access to the mobile communications network by the mobile communications devices within the restricted area,
 wherein the backup configuration specifies criteria for determining whether or not to provide access to the service of the mobile communications network in the event that said one of the one or more transmitters is not functioning correctly.

10. The system of claim 1, comprising a home location register, HLR, arranged to store subscription information for each of the designated test mobile communications devices,
 wherein the access control entity is arranged to determine that the first mobile communications device is one of the designated test mobile communications devices by comparing the first identification data received from a first mobile communications device with subscription information stored in the HLR.

11. A method of restricting access to a mobile communications network by mobile communications devices within a restricted area, the method comprising:
 arranging one or more transmitters to transmit respective beacon signals for reception by mobile communications devices within the restricted area;
 designating one or more mobile communications devices as test mobile communications devices
 installing the one or more designated test mobile communications devices in respective fixed positions to receive the beacon signals transmitted by the one or more transmitters;
 receiving, from a first mobile communications device, first identification data and first measurement data indicative of reception by the first mobile communications device of a first beacon signal transmitted by one of the one or more transmitters; determining, using the first identification data, that the first mobile communications device is one of the designated test mobile communications devices;
 determining, using the first measurement data, whether said one of the one or more transmitters is functioning correctly and positioned correctly relative to the fixed position of the first mobile communications device for restricting the access to the mobile communications network by the mobile communications devices within the restricted area;
 receiving, from a second mobile communications device, second identification data and second measurement data indicative of reception of the first beacon signal by the second mobile communications device;
 determining, using the second identification data, that the second mobile communications device is not one of the one or more designated test mobile communications devices; and
 deciding, based on the second measurement data, whether or not to provide the second mobile communication device with access to a service of the mobile communications network.

12. The method of claim 11, wherein:
 the first measurement data comprises a measured signal strength of the beacon signal received by the first mobile communications device; and
 determining whether said one of the one or more transmitters is positioned correctly and functioning correctly comprises determining that the measured signal strength is within a respective range.

13. The method of claim 11, wherein:
 the first measurement data comprises an average measured signal strength of the beacon signal received by the first mobile communications device over a plurality of measurements; and
 determining whether said one of the one or more transmitters is positioned correctly and functioning correctly comprises determining that the average measured signal strength is within a respective range.

14. The method of claim 11, wherein determining whether said one of the one or more transmitters is positioned correctly and functioning correctly comprises determining whether a set of measurement criteria associated with the first mobile communications device is satisfied, the method further comprising:
 receiving, from the first mobile communications device, third measurement data indicative of reception by the first mobile communications device of the beacon signal transmitted by the first transmitter during a configuration process; and
 configuring the set of measurement criteria in dependence on the third measurement data.

15. The method of claim 11, wherein each of the first measurement data and the second measurement data is received within a respective measurement report.

16. The method of claim 11, comprising receiving measurement data from each of the one or more designated test mobile communications devices in accordance with a predetermined schedule.

17. The method of claim 16, further comprising generating an alert when one of the designated test mobile communications devices fails to provide measurement data in accordance with the predetermined schedule.

18. The method of claim 11, further comprising generating an alert upon determining that said one of the one or more transmitters is not positioned correctly and functioning correctly for restricting the access to the mobile communications network by the mobile communications devices within the restricted area.

19. The method of 11, further comprising initiate a backup configuration for the access control entity upon determining that said one of the one or more transmitters is not positioned correctly and functioning correctly for restricting the access to the mobile communications network by the mobile communications devices within the restricted area,
 wherein the backup configuration specifies criteria for determining whether or not to provide access to the service of the mobile communications network in the event that said one of the one or more transmitters is not functioning correctly.

20. A non-transient storage medium comprising machine readable instructions which, when executed by a computing system communicable with mobile communications devices within a restricted area via a base station, cause the computing system to:
 determine, using first identification data received from a first mobile communications device, that the first mobile communications device is a designated test mobile communications device installed in a fixed position;

determine, using first measurement data received from the first mobile communications device indicative of reception by the first mobile communications device of a first beacon signal transmitted by a first transmitter, whether the first transmitter is functioning correctly and positioned correctly relative to the fixed position of the first mobile communications device for restricting the access to the mobile communications network by the mobile communications devices within the restricted area;

receiving, from a second mobile communications device, second identification data and second measurement data indicative of reception of the first beacon signal by the second mobile communications device;

determine, using the second identification data, that the second mobile communications device is not a designated test mobile communications device; and decide, based on the second measurement data, whether or not to provide the second mobile communication device with access to a service of the mobile communications network.

\* \* \* \* \*